2,868,795
PYRIDYL DICYANOALKANES AND PROCESS

Francis E. Cislak, Indianapolis, Ind., assignor to Reilly Tar & Chemical Corporation, Indianapolis, Ind., a corporation of Indiana No Drawing. Application February 17, 1958
Serial No. 715,531

7 Claims. (Cl. 260—294.9)

This invention relates to dicyanopyridylalkanes and to the process of making them. More particularly it relates to dicyanopyridylalkanes having the following general formula:

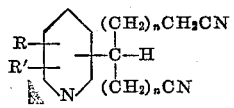

wherein R and R' are hydrogen or lower alkyl and $n$ is a small integer selected from 1 to 4.

In general, the compounds of my invention may be prepared by reacting sodamide with a pyridine having as a substituent the group $-(CH_2)_n \cdot CN$ and then reacting the resulting sodiopyridine with a chloroalkylnitrile. The equation below depicts the formation of 1,5-dicyano-3-(4-pyridyl)pentane:

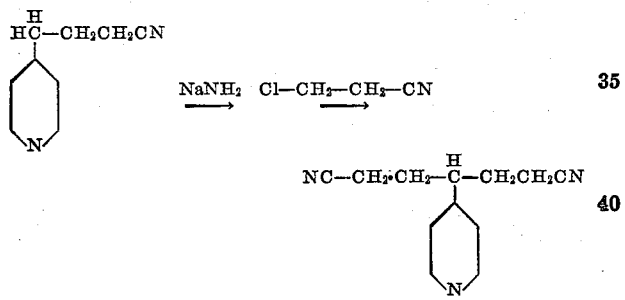

Some of my dicyanopyridylalkanes may be prepared by the condensation of a 2-picoline or a 4-picoline with acrylonitrile in the presence of an alkali metal catalyst. The equation below portrays the formation of 1,5-dicyano-3-(2-pyridyl)pentane:

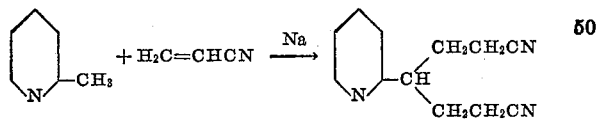

My invention will be described more fully in conjunction with the following specific examples.

EXAMPLE 1

*1,5-dicyano-3-(4-pyridyl)pentane*

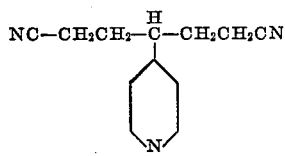

Thirty-nine grams (one mole) of finely divided sodamide, prepared in any suitable manner, are dispersed in 2,000 cc. of liquid ammonia. To this dispersion of sodamide in liquid ammonia is added about 146 grams (one mole) of 3-(4-pyridyl)butyronitrile. The latter compound is added in small portions to more readily control the reaction. After all of the 3-(4-pyridyl)butyronitrile has been added, the mixture is stirred for about another one-half to one hour. Then about 89 grams (one mole) of 2-chloropropionitrile is added in small portions. The reaction mixture is mechanically stirred during the addition of the chloropropionitrile; the stirring is continued for from six to twelve hours after all the chloropropionitrile has been added. The 1,5-dicyano-3-(4-pyridyl)pentane formed during the reaction period is isolated in any suitable manner.

One way of isolating the 1,5-dicyano-3-(4-pyridyl)pentane is as follows: The ammonia is evaporated. Methanol and then water are added to decompose any unreacted sodamide; the reaction mixture is kept cold (0° C.) during the decomposition to prevent hydrolysis of the 1,5-dicyano-3-(4-pyridyl)pentane. Then 4-picoline is added and the mixture thoroughly agitated. Upon settling, two layers are formed, a caustic aqueous layer and the 4-picoline layer containing the 1,5-dicyano-3-(4-pyridyl)pentane. Some of the caustic aqueous layer is also dissolved in the 4-picoline layer; this is neutralized as with carbon dioxide. The 4-picoline, any unreacted 3-(4-pyridyl)butyronitrile, and the 1,5-dicyano-3-(4-pyridyl)pentane are separated from each other by fractional distillation under vacuum, the 1,5-dicyano-3-(4-pyridyl)pentane distilling over above about 150° C. at 1 mm.

The reaction in liquid ammonia may be carried out at atmospheric pressure or it may be conducted at superatmospheric pressures. Commercially, I prefer to use superatmospheric pressures in the order of 100–200 lbs./sq. in.

While I prefer to use liquid ammonia as my reaction medium, I can use other media such as dimethylaniline, diethylether, or the like.

EXAMPLE 2

*1,6-dicyano-3-(2-pyridyl)hexane*

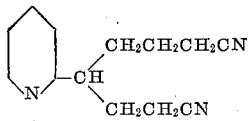

The procedure of Example 1 is repeated except that in place of the 3-(4-pyridyl)butyronitrile, I use one mole of 3-(2-pyridyl)butyronitrile and in place of the 2-chloropropionitrile I use one mole of 3-chloro-butyronitrile.

EXAMPLE 3

*1,5-dicyano-3-(2,5-ethylpyridyl)pentane*

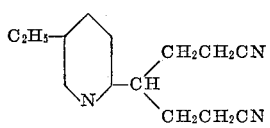

The procedure of Example 1 is followed with the exception that in place of the 3-(4-pyridyl)butyronitrile, I use one mole of 3-(2,5-ethylpyridyl)butyronitrile.

EXAMPLE 4

*1,5-dicyano-3-(2-pyridyl)pentane*

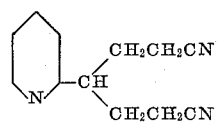

The procedure of Example 1 is followed with the exception that in place of the 3-(4-pyridyl)butyronitrile, I use one mole of 3-(2-pyridyl)butyronitrile.

EXAMPLE 5

*1,5-dicyano-3-(3-pyridyl)pentane*

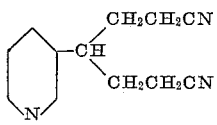

The procedure of Example 1 is followed with the exception that in place of the 3-(4-pyridyl)butyronitrile, I use one mole of 3-(3-pyridyl)butyronitrile.

EXAMPLE 6

*1,7-dicyano-4-(4-pyridyl)heptane*

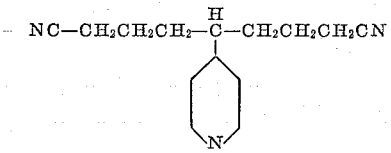

The procedure of Example 1 is followed with the exception that in place of the 3-(4-pyridyl)butyronitrile, I use one mole of 4-(4-pyridyl)pentanonitrile and in place of the 2-chloropropionitrile I use one mole of 3-chlorobutyronitrile.

EXAMPLE 7

*1,5-dicyano-3-(4-2,6-dimethylpyridyl)pentane*

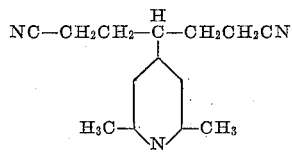

The procedure of Example 1 is repeated except that in place of the 3-(4-pyridyl)butyronitrile, I use one mole of 3-(4-2,6-dimethylpyridyl)butyronitrile.

EXAMPLE 8

*1,4-dicyano-2-(2-pyridyl)butane*

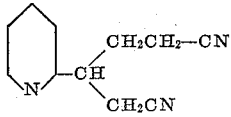

The procedure of Example 1 is followed with the exception that in place of the 3-(4-pyridyl)butyronitrile, I use one mole of 2-(2-pyridyl)propionitrile.

The dicyanopyridylalkanes of my invention are difunctional aliphatic nitriles. They have the chemical properties associated with the nitriles and are capable of entering into the same type of reaction as do other aliphatic nitriles, within the limitations imposed by the pyridine nucleus. They are soluble in dilute mineral acids and possess a low volatility. A solution of about 5% of my dicyanopyridylalkanes in high boiling coal tar bases is a useful inhibitor for the pickling of steel with aqueous non-oxidizing inorganic acids.

Of the many reactions possible with my dicyanopyridylalkanes, those of most commercial significance are the hydrolysis to pyridine dicarboxylic acids and the hydrogenation to pyridine diamines.

Heating the dicyanopyridylalkanes with aqueous caustic converts the nitrile groups to carboxyl groups:

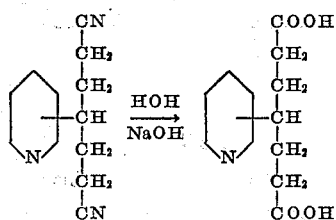

These pyridine dicarboxylic acids are homologs of the pyridine dicarboxylic acids described and claimed in my U. S. Patent No. 2,763,658 issued September 18, 1956. They may be used in place of the acids of the above mentioned patent.

Catalytic hydrogenation of my dicyanopyridylalkanes converts the nitrile groups to methylamino groups:

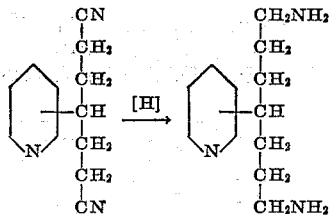

These pyridyldiamines are useful curing agents for epoxy resins. They are also useful in the preparation of synthetic fibers of the linear polyamide type, commonly referred to as nylons. By the use of a small percentage (3% to 10%) of these pyridine diamines in the molecular make-up of the polyamide resin, the dyeing properties are greatly enhanced. The presence of the pyridine ring nitrogen furnishes a point of attachment for acid dyes, thereby enabling the fibers to be dyed in the usual manner.

I claim as my invention:

1. Compounds of the class consisting of dicyanopyridylalkanes having the following general formula:

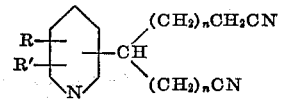

wherein R and R' are selected from the group consisting of hydrogen and lower alkyl and $n$ is a small integer selected from 1 to 4 inclusive.

2. The compound 1,5-dicyano-3-(2-pyridyl)pentane.

3. The compound 1,5-dicyano-3-(4-pyridyl)pentane.

4. The compound 1,5 - dicyano - 3 - (2,5-ethylpyridyl)pentane.

5. The compound 1,5-dicyano-3-(3-pyridyl)pentane.

6. The compound 1,5-dicyano-3-(4-2,6-dimethylpyridyl)pentane.

7. The process of preparing compounds of the class consisting of dicyanopyridylalkanes having the following general formula:

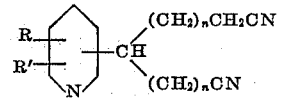

wherein R and R' are selected from the group consisting of hydrogen and lower alkyl and $n$ is a small integer selected from 1 to 4 inclusive, which comprises reacting sodamide with a pyridine compound having as a substituent the group—$(CH_2)_nCN$, and then reacting the resulting compound with a chloroalkylnitrile having the formula $Cl—(CH_2)_nCN$.

No references cited.